United States Patent
Amoni et al.

(10) Patent No.: US 6,535,947 B1
(45) Date of Patent: Mar. 18, 2003

(54) METHODS, SYSTEMS AND COMPUTER PROGRAM PRODUCTS FOR LOGICALLY SEGMENTING DEVICES ON A UNIVERSAL SERIAL BUS

(75) Inventors: Sergio Amoni, Boca Raton, FL (US); Phuc Ky Do, Cary, NC (US); Kumar Basalingappa Kori, Cary, NC (US); Robert E. Russell, Jr., Cary, NC (US); David Arthur Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/583,666

(22) Filed: May 30, 2000

(51) Int. Cl.$^7$ .............................................. G06F 13/00
(52) U.S. Cl. ...................... 710/305; 710/104; 710/300
(58) Field of Search .............................. 710/8, 10, 100, 710/104, 300, 305; 713/1

(56) References Cited

U.S. PATENT DOCUMENTS

| 5,832,492 A | 11/1998 | Wooten | 707/101 |
| 5,857,080 A | 1/1999 | Jander et al. | 395/307 |
| 5,903,777 A | 5/1999 | Brief | 395/880 |
| 5,933,611 A | 8/1999 | Shakkarwar | 395/306 |
| 6,011,486 A * | 1/2000 | Casey | 340/7.29 |

OTHER PUBLICATIONS

Draft, *An Introduction to USB 2.0—Draft 0.9* (1999).
*Universal Serial Bus: Plug–and–Play C Single PC (Part 1 of 2); Technical Perspective*, www.cypress.com/design/techarticles/v3n1p4.html, Aug. 16, 1999.
*Universal Serial Bus: Plug–and–Play Connectivity for Multiple Peripherals on Single PC (Part 2 of 2); Technical Perspective*, www.cypress.com/design/techarticles/v3n1p5.html, Aug. 16, 1999.

* cited by examiner

*Primary Examiner*—Xuan M. Thai
(74) *Attorney, Agent, or Firm*—J. Bruce Schelkopf; Myers Bigel Sibley & Sajovec, P.A.

(57) ABSTRACT

Methods, systems and computer program products are provided for segmenting a plurality of Universal Serial Bus (USB) devices connected to a common root hub into clusters. The devices may be segmented based on the connection topology. Such a segmentation may be performed without user intervention to define the clusters by designating a particular port(s) of USB hubs as expansion ports such that a USB hub connected to an expansion port starts a new cluster and may act as a cluster root hub. Devices connected to a cluster root hub may be considered in the same cluster if there is no intervening cluster root hub.

33 Claims, 5 Drawing Sheets

METHODS, SYSTEMS AND COMPUTER PROGRAM PRODUCTS FOR LOGICALLY SEGMENTING DEVICES ON A UNIVERSAL SERIAL BUS

FIELD OF THE INVENTION

The present invention relates to the Universal Serial Bus (USB) and more particularly to devices connected to a processing system through a USB port.

BACKGROUND OF THE INVENTION

One common use of a data processing system is a point of sale terminal which is used in retail sales to memorialize and track sales transactions. Conventional point of sale terminals include a data processor as well as peripheral and input devices such as a display, keyboard, printer, cash drawer and the like which are provided for each terminal. Such a point of sale terminal may be provided, for example, at each checkout lane in a retail store. Each of these devices may have its own unique address associated with it and this address may be utilized for communications between the data processor and the devices.

Because of the expense of data processing systems it has been found to be advantageous to share a data processing system with two checkout lanes. Expansion of the point of sale terminal to include operation of a cluster of devices for a second checkout lane has conventionally been accomplished by providing a remote expansion station with separate inputs for each device in the expansion cluster and an output to the host data processing system so that the cluster of devices of the second lane may communicate with the data processing system. The output of the remote expansion station is then treated separately by the data processing system so as to separate the expansion cluster of devices from the devices of the first checkout lane. Thus, the separation of the inputs to the data processing system may be maintained such that the addresses of the cluster of devices connected to the remote expansion station would be associated with the second lane.

One difficulty with physically separating the inputs for devices from the first checkout lane with those for the expansion checkout lane is that a separate input generally is required for each expansion lane. Thus, the number of expansion lanes may be limited to the number of expansion inputs for the data processing system. One advantage of such a system, however, is that setup may be straightforward in that a user may readily determine where to connect the devices of the two checkout lanes. However, because the possible connection configurations are limited, the amount of operator intervention which may be needed for setup and configuration may be reduced.

While conventional point of sale terminals may be suitable in many systems, increased processor capabilities may permit additional expansion of the number of checkout lanes which may be serviced by a single data processing system. Thus, a need exists for more flexible expansion of point of sale terminals.

In conventional personal computer systems, the Universal Serial Bus (USB) architecture has been proposed to allow multiple devices to connect to a single data processing system. The USB architecture automatically detects a device being connected and provides a unique address to each device which may then be used to communicate with the device over the common USB connection. Typically, a USB system may be expanded by providing a USB hub which provides USB port replication. A USB hub may be connected to another USB hub and service multiple USB ports. Up to 127 devices may be connected to a data processing system through a USB interface.

While the USB architecture may provide simplified connection of devices to a data processing system, the connected devices typically are treated as individual devices. The addresses of the devices are unique but do not provide information about how to cluster devices to provide expansion.

Accordingly, in light of the above discussion, a need exists for improvements in the expansion of point of sale terminals to allow expansion through a USB port.

SUMMARY OF THE INVENTION

The present invention may provide methods, systems and computer program products for segmenting a plurality of Universal Serial Bus (USB) devices connected to a common root hub into clusters. The devices may be segmented based on the connection topology. Such a segmentation may be performed without user intervention to define the clusters by designating a particular port(s) of USB hubs as expansion ports such that a USB hub connected to an expansion port starts a new cluster and may act as a cluster root hub. Devices connected to a cluster root hub may be considered in the same cluster if there is no intervening cluster root hub.

In particular embodiments of the present invention a device topology of the plurality of USB devices connected to the common root hub is obtained. The device topology is traversed to identify a USB hub which is connected to a predefined port, such as the lane/cluster expansion port, of another USB hub as a cluster root hub. USB devices connected to a cluster root hub other than a USB hub connected to the predefined port of another USB hub are identified so as to associate the USB devices with the cluster root hub. The USB devices associated with the same cluster root hub may then be treated as a cluster. In a preferred embodiment, the lane/cluster expansion port is port 1.

In a further embodiment of the present invention, the device topology may be obtained by requesting the device topology via an operating system utility and receiving the device topology from the operating system utility. Furthermore, the USB devices in the same cluster may be communicated with as if the USB devices were components of a single device.

In a still further embodiment of the present invention, the traversal of the topology, and identification of cluster root hubs and treating of devices as a cluster are carried out for the entire device topology so as to define each cluster root hub in the device topology and clusters of USB devices of associated with each cluster route hub.

In a particular embodiment of the present invention, the device topology is traversed in a depth-wise fashion. The topology may be traversed in a depth-wise manner by evaluating devices connected to a device until a device with no further devices connected to it is reached. In an alternative embodiment, the device topology is traversed in a breadth-wise fashion. The topology may be traversed in a breadth-wise fashion by evaluating device characteristics for all devices at a given degree of remoteness from the root hub before devices for the next further degree of remoteness are evaluated.

In yet another embodiment of the present invention, an alias address is associated with each of the USB devices within the cluster so as to provide an address for each of the USB devices within the cluster which identifies the USB device as within the cluster.

In one embodiment of the present invention, the data processing system is a point of sale terminal. Furthermore, the cluster may correspond to expansion checkout lanes such that USB devices in a cluster are treated as a point of sale terminal for a checkout lane. Such USB devices may include a display, a keyboard, a printer, a cash drawer, a magnetic stripe reader and the like.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or a computer program products for segmenting devices connected to a USB interface into logical clusters. Such logical clusters may, for example, be utilized to provide an expansion checkout lane for a point of sale terminal. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
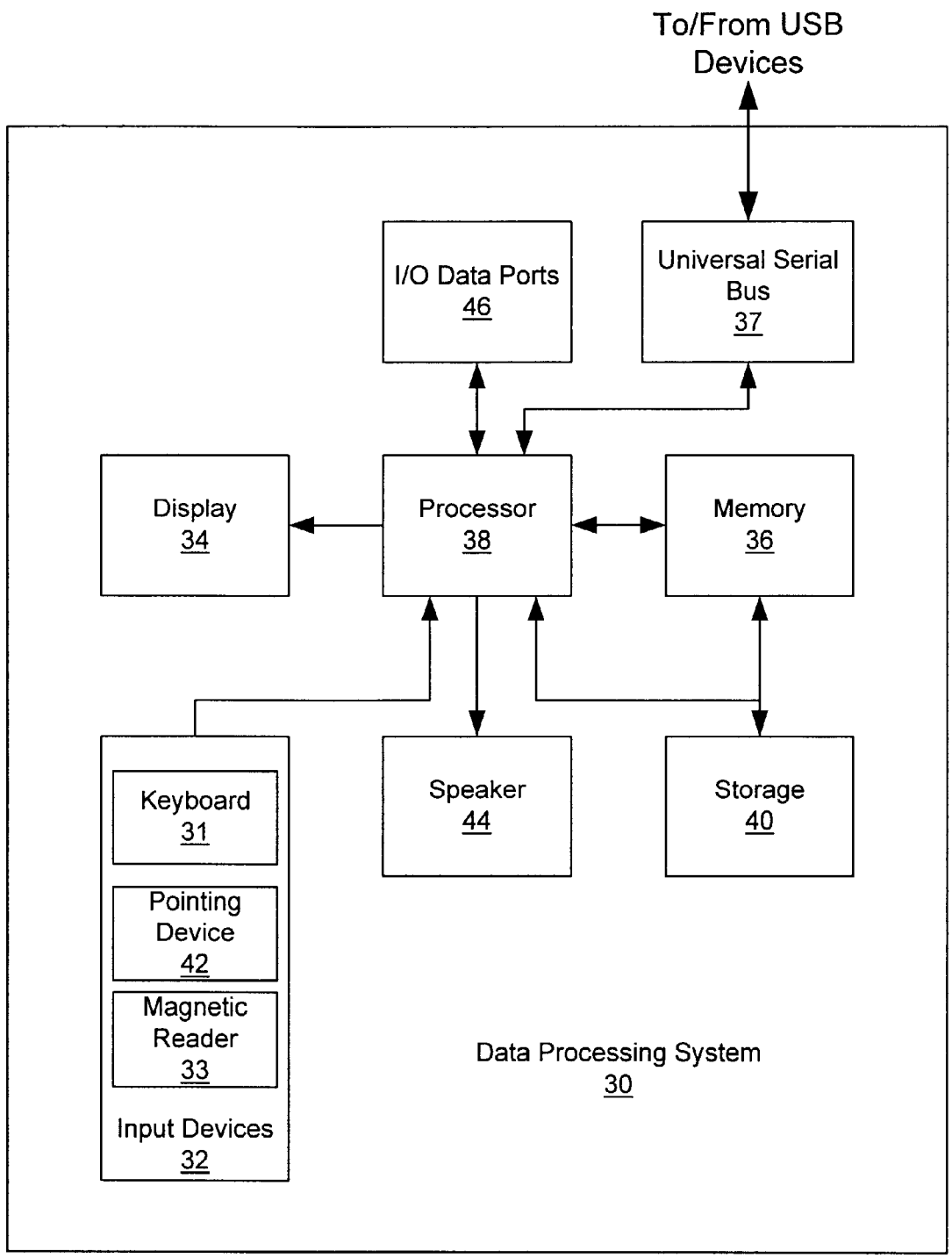
FIG. 1 is a diagram of a data processing system suitable for use with the present invention.

Referring now to FIG. 1, an exemplary embodiment of a data processing system 30 in accordance with the present invention may include input devices 32, such as a keyboard or keypad 31, a pointing device 42 and/or a magnetic stripe reader 33. The data processing system 30 also preferably includes a display 34 and a memory 36 that communicate with a processor 38. The data processing system 30 may further include a speaker 44 and an I/O data port(s) 46 that also communicate with the processor 38. The I/O data ports 46 can be used to transfer information between the data processing system 30 and another computer system or a network (e.g., the Internet). FIG. 1 also illustrates that data processing system 30 may include a storage device 40 which communicates with memory 36 and processor 38. Such a storage device may be any type of data storage device as described above.

Also illustrated as part of the data processing system 30 is a Universal Serial Bus (USB) interface 37 which allows USB devices to connect to the data processing system 30 and communication with the processor 38. As will be appreciated by those of skill in the art, any suitable USB compatible devices may be connected through the USB interface 37. Furthermore, enhanced USB devices, such as those utilizing power supply voltages of greater than 5 volts, may also be connected to the data processing system 30. Thus, the present invention should not be construed as utilizing any particular USB devices but may be used with any devices which may communicate over the USB interface 37.

Furthermore, while the present invention is described with respect to the data processing system 30, as will be appreciated by those of skill in the art, the present invention may be incorporated into many other devices where USB communications are utilized and, thus, may comprise an embedded function in many other devices. Thus, the present invention should not be construed as limited to use in data processing systems such as illustrated in FIG. 1 but may be incorporated in any device having sufficient capabilities to carry out the operations described below. In particular, the teachings of the present invention may be embodied in a point of sale terminal so as to allow expansion of the checkout lanes serviced by a processor 38 of the point of sale terminal through use of the USB interface 37.

Figure 2:
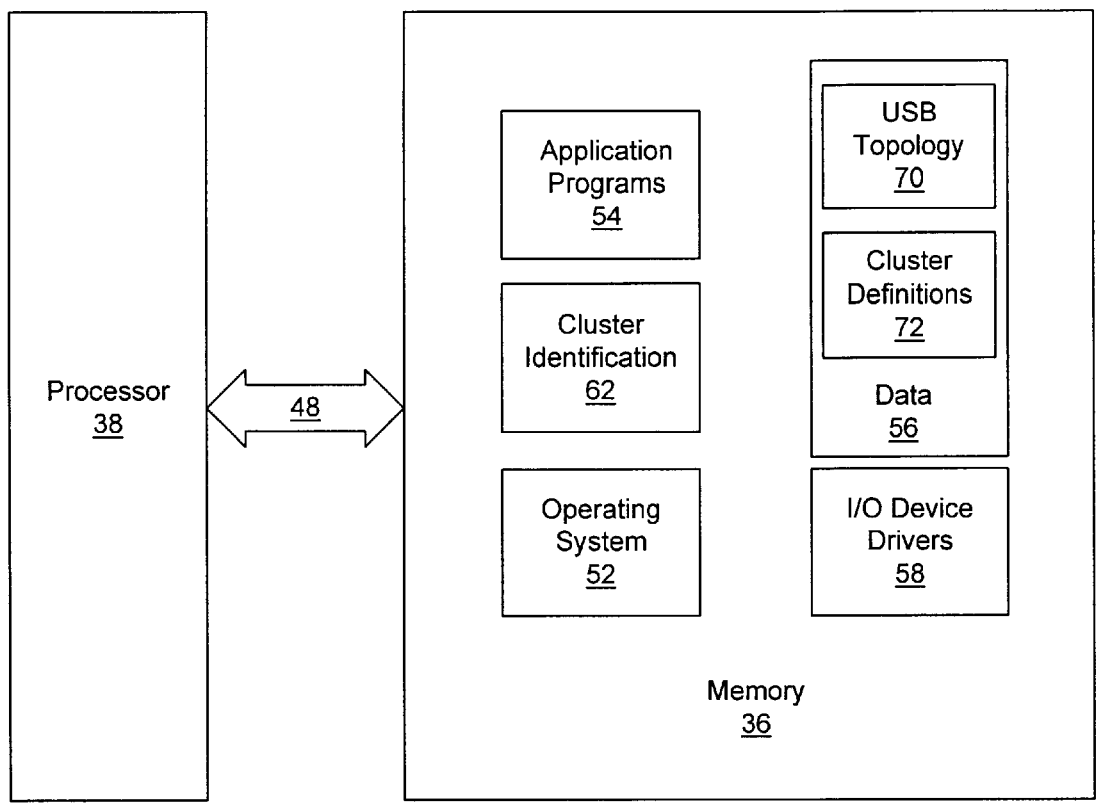
FIG. 2 is a detailed view of a data processing system suitable for use with the present invention.

FIG. 2 is a more detailed block diagram of the data processing system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash, SRAM, and DRAM.

As shown in FIG. 2, the memory 36 may hold four major categories of software and data used in the data processing system 30: the operating system 52; the application programs 54 which may include a cluster identification module 62; the device drivers such as the I/O device drivers 58; and the data 56. The I/O device drivers 58 typically include software routines accessed through the operating system 52 by the application programs 54 to communicate with devices such as the USB interface 37, input devices 32, the display 34, the speaker 44, the pointing device 42, the I/O data port(s) 46, and certain memory 36 components. The application programs 54 comprise the programs that implement the various features of the data processing system 30. In particular, in an embodiment of the present invention the application programs 54 include a cluster identification module 62 which carries out the operations of the present invention for logically segmenting a topology of devices connected through the USB interface 37 to provide clusters of devices. Finally, the data 56 represents the static and dynamic data used by the application programs 54, operating system 52, I/O device drivers 58, cluster identification module 62 and any other software program that may reside in the memory 36. As illustrated in FIG. 2, the data 56 preferably includes a USB topology 70 which may be accessed through the operating system 52 which indicates the devices connected to the USB interface 37 and how those devices are interconnected. Furthermore, the data 56 preferably includes cluster definitions 72 generated by the cluster identification module 62 which identifies an association between USB addresses and logical clusters. Additional intermediate data (not shown) may also be stored in memory.

While the present invention is described as incorporated in a cluster identification module 62, as will be appreciated by those of skill in the art, the present invention may be implemented in any number of manners, including incorporation in the operating system 52 or in a device driver 58. Accordingly, the present invention should not be construed as limited to the partitioning of functions between the various modules and components illustrated in FIG. 2 but may be carried out by any configuration which performs the operations described herein or their equivalent.

Figure 3:
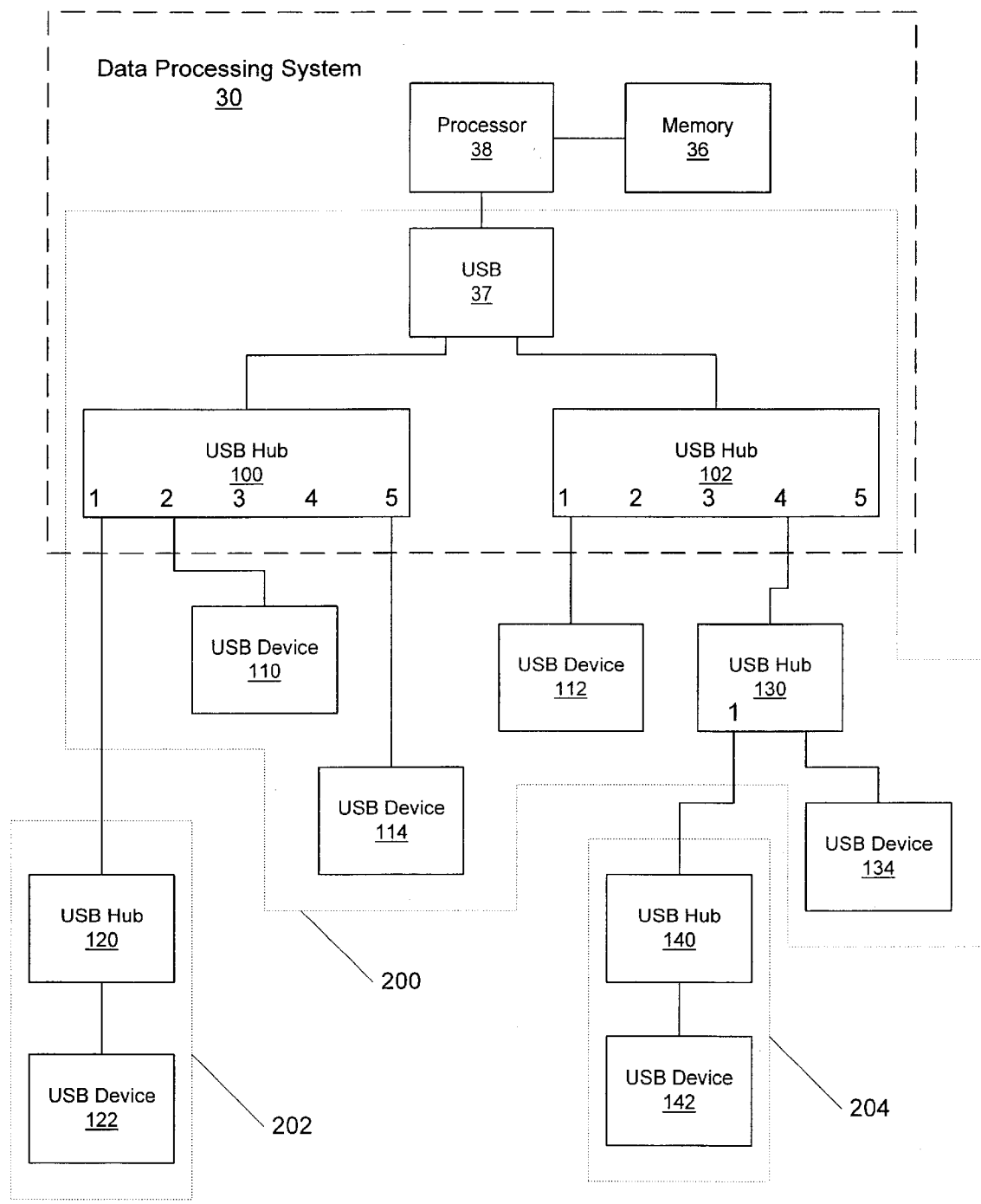
FIG. 3 is a diagram of a point of sale terminal system according to an embodiment of the present invention.

While the present invention may be utilized with many differing configurations of data processing systems 30, one use of the present invention may be include data processing system 30 being utilized as a point of sale terminal. An exemplary configuration of such a point of sale terminal is illustrated in FIG. 3. As seen in FIG. 3, the data processing system 30 may include the USB interface 37 which may act as a root hub. One or more USB hubs 100 and 102 may be connected to the root hub and may be incorporated in the data processing system 30 or be external to the data processing system 30. Furthermore, to each of the USB hubs 100 and 102, one or more USB devices, including additional USB hubs, may be connected. Thus, for example, the USB hub 100 may have a USB hub 120 connected to USB port 1, the USB device 110 connected to USB port 2 and the USB device 114 connected to USB port 5. Similarly, the USB hub 102 may have the USB device 112 connected to USB port 1 and the USB hub 130 connected to USB port 4.

In addition to the devices connected to the USB hubs 100 and 102, additional USB devices may be connected to the USB hubs 120 and 130. For example, the USB device 122 may be connected to the USB hub 120. Similarly, the USB device 134 may be connected to the USB hub 130. Also, the USB hub 140 may be connected to the USB port 1 of the USB hub 130 and the USB device 142 may be connected to the USB hub 140.

As described in more detail below, according to an embodiment of the present invention, the USB topology, such as that illustrated in FIG. 3, is segmented based on the ports of USB hubs in which the USB devices are connected. If a USB hub is connected to a lane/cluster expansion port, then USB devices connected to that USB hub are treated as part of the same cluster of devices. In the USB topology illustrated in FIG. 3, the lane/cluster expansion port may be port 1. Thus, as seen in FIG. 3, the USB hub 120 is connected to port 1 of the USB hub 100 and, therefore, would be considered as a "root hub" of a new cluster, referred to herein as a "cluster root hub," such that devices connected to USB hub 120 would be in the same cluster. Accordingly, as illustrated in FIG. 3, the USB hub 120 and the USB device 122 connected to the USB hub 120 form the logical cluster 202. Similarly, devices connected to the root hub 37 may form the logical cluster 200. As illustrated in FIG. 3, the USB hubs 100 and 102 are connected to port 1 of the root hub 37 and do not form a separate cluster. Because devices must be connected to the root hub 37, such connections can be treated as a special case of the cluster definition rules and, even if a hub were connected to port 1, the hub could be considered as part of a separate cluster which included the root hub 37. Alternatively, other special treatment of devices connected to the root hub 37 could be provided or the cluster definition rules described herein could be applied. For example, all hubs connected to the root hub 37 could be treated as cluster root hubs and, therefore, start separate clusters.

Also illustrated in FIG. 3 is the instance where a USB hub is connected to a port other than port 1. The USB hub 130 is connected to port 4 of the USB hub 102. However, because the USB hub 130 is not connected to the lane/cluster expansion port, then a new cluster is not started. Thus, the number of devices in a cluster may be expanded beyond the capabilities of a single hub without creating a new cluster. However, also illustrated in FIG. 3 is the USB hub 140 which is connected to port 1 of the USB hub 130. Because the USB hub 140 is connected to port 1 of a USB hub, then the USB hub 140 may be considered a cluster root hub of a new cluster and the USB device 142 connected to the USB hub 140 would be considered as part of the logical cluster 204. Thus, the USB hub 140 illustrates that a cluster may be started at any point in the USB topology where the lane/cluster expansion port is available for connection.

While aspects of the present invention have been described with reference to the lane/cluster expansion port being port 1, as will be appreciated by those of skill in the art, other ports may be designated as the port which starts a new cluster. Furthermore, as briefly described above, other rules may be established for when a USB hub starts a cluster, however, for simplicity in installation, fewer exceptions may be preferred. Furthermore, the USB topology and point of sale terminal configuration are provided merely to assist in illustrating aspects of the present invention. The present invention should not be construed as limited to any particular topology or data processing system configuration. Thus, any configuration which provides USB support from which a USB topology may be determined and evaluated may be utilized.

Figure 4:
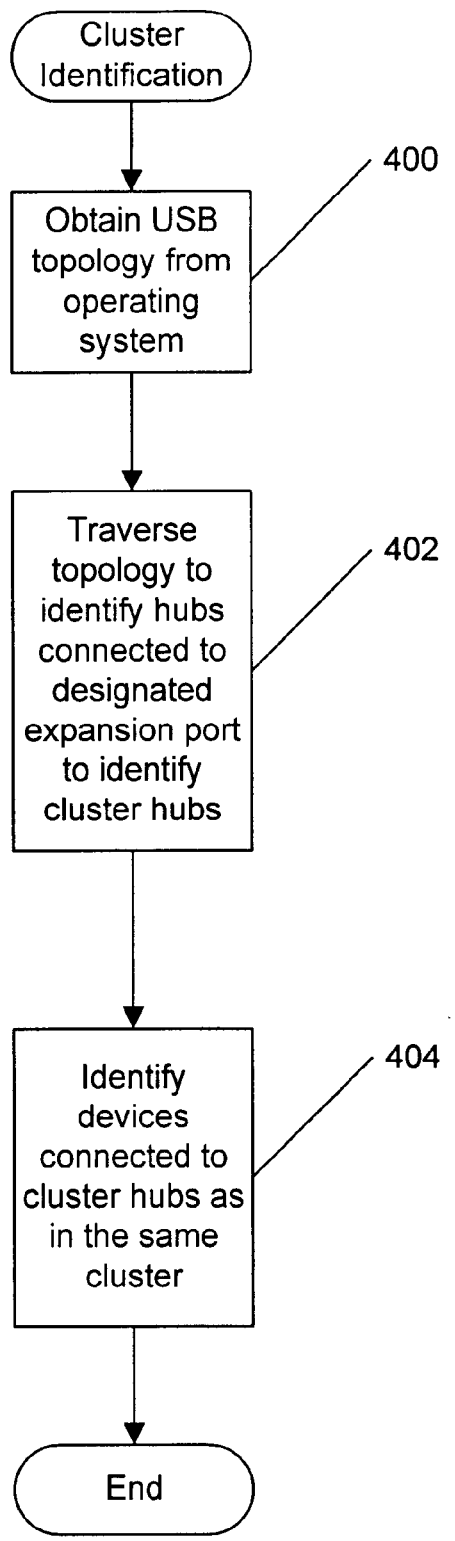
FIG. 4 is a flowchart illustrating operations according to an embodiment of the present invention.
Figure 5:
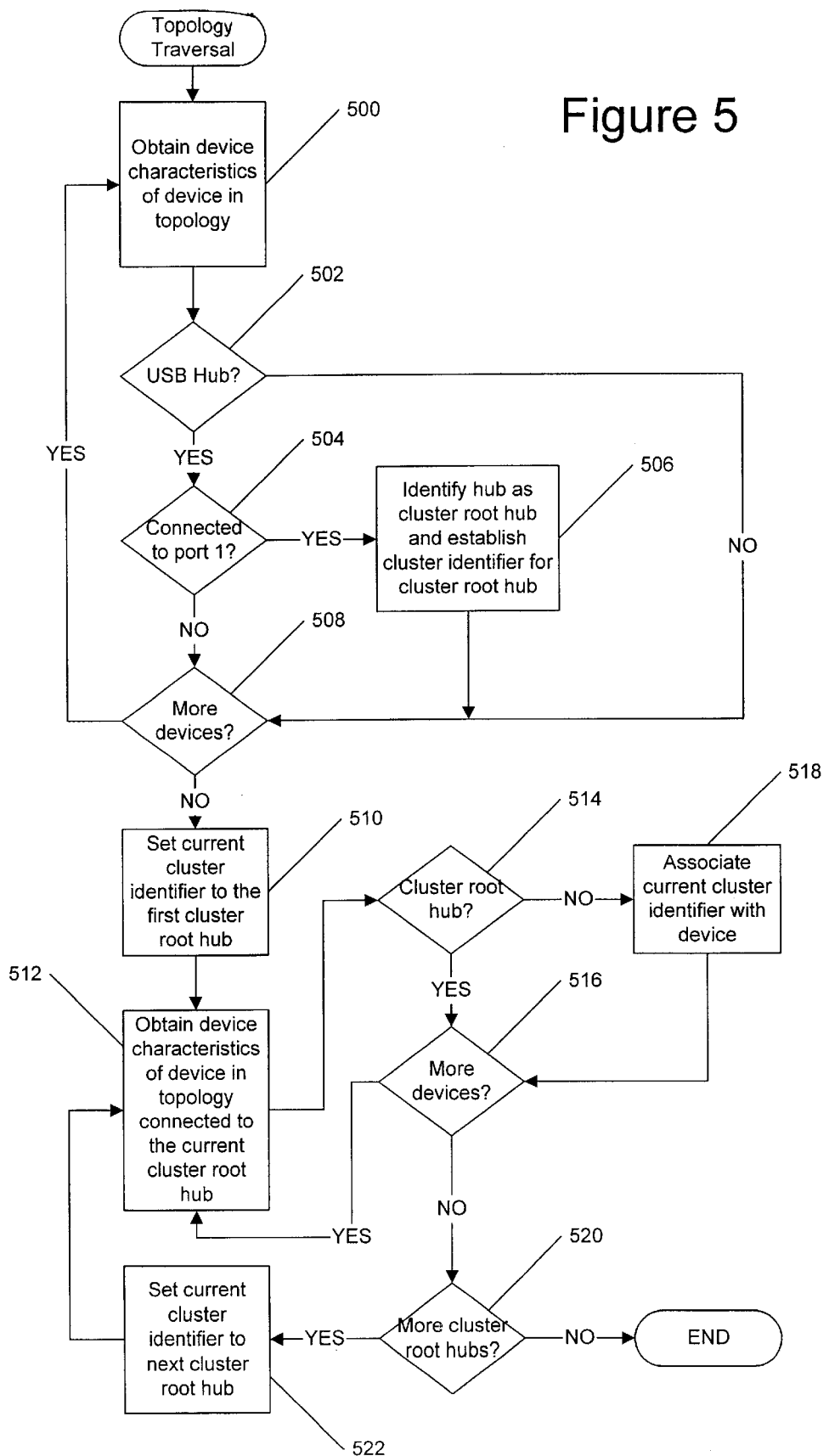
FIG. 5 is a flowchart illustrating more detailed operations of an embodiment of FIG. 4 according to the present invention.

Embodiments of the present invention will now be described with respect to FIGS. 1 through 5. FIGS. 4 and 5 are flowchart illustrations of embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowcharts and/or block diagram block or blocks. The computer program instructions may be executed by a processor to cause a series of operational steps to be performed by the processor to produce a computer implemented process such that the instructions which execute on the processor provide steps for implementing the functions specified in the flowcharts and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

As seen in FIG. 4, operations of a cluster identification module 62 according to an embodiment of the present invention may begin by obtaining the USB topology data 70 from the operating system 52 (block 400). The USB topology data 70 may be obtained, for example, through the use of the USBVIEW utility which may be provided as part of the Driver Development Kit (DDK) of Windows© 98 and Windows© 2000 operating systems of Microsoft Corporation, Redmond, Wash. The USB topology data 70 is then traversed to identify USB hubs which are connected to the designated expansion port of another USB hub (block 402). These USB hubs are identified as cluster root hubs as they start a new cluster. In the example in FIG. 3, the USB hubs 120 and 140 may be identified as cluster root hubs. In addition, the root hub of the USB topology may be treated as a special case to the cluster dividing rules described herein and identified as a cluster root hub despite the root hub of the topology not being connected to port 1 of another hub. In addition to identifying the cluster root hubs, the devices connected to the cluster root hubs may be identified and associated with the cluster of the root hub to which they are attached so as to provide a definition for each cluster (block 404).

The cluster definitions 72 may provide an association of USB addresses with a cluster identifier so as to identify which USB devices are in a cluster. Applications may utilize the cluster definitions 72 to treat devices in the same cluster as a logical unit. For example, a USB display, USB keyboard, USB printer and USB cash drawer may be included in the same cluster and treated as a separate point of sale station to provide an expansion checkout lane. The cluster definitions 72 may provide an address translation through, for example, assignment of an alias address to the USB devices based on the cluster of the device, or other such techniques known to those of skill in the art so as to allow devices in a cluster to be treated as a logical unit. Through the use of address translation, the techniques of the present invention may be utilized with existing applications and may not require modification of the existing applications.

FIG. 5 illustrates operations for carrying out aspects of the operations of blocks 402 and 404 of FIG. 4 according to one embodiment of the present invention. As seen in FIG. 5, at block 500, the characteristics of a device in the USB topology data 70 are obtained. These characteristics may include the type of device and to which the device is connected. It is then determined if the device is a USB hub (block 502). If the device is a USB hub, it may be determined if the device is connected to port 1 of another USB device (block 504). If the device is connected to port 1, then the device is identified as a cluster root hub and a cluster identifier associated with the device (block 506). If the device is not connected to port 1 (block 504), then if there are more devices to evaluate in the USB topology (block 508), the characteristics of the next device in the topology are obtained (block 500). Returning to block 502, if the device is not a USB hub, then operations continue at block 508 and it is determined if there are more devices to evaluate.

After identifying the cluster root hubs, the devices associated with the cluster root hubs may then be determined. At block 510, the cluster root hub associated with the first cluster identifier is obtained to provide an initial current cluster root hub. Device characteristics are obtained for a device in the USB topology data 72 connected to the current cluster root hub (block 512). It may then be determined if the device is another cluster root hub (block 514) and if not, then the device is associated with the current cluster identifier (block 518). If the device is a cluster root hub (block 514), then if there are more device to evaluate (block 516), the characteristics are obtained for a next device in the USB topology data 72 connected to the current cluster root hub (block 512). These operations continue until all the devices connected to a cluster root hub or to a hub connected to the cluster root hub which is not itself a cluster root hub (i.e. all devices which are connected through the cluster root hub without an intervening cluster root hub) have been evaluated.

If there are no more devices which have not been evaluated connected to the current cluster root hub (block 516), then it may be determined if there are additional cluster root hubs to evaluate (block 520). If more cluster root hubs are to be evaluated (block 520), then the current cluster identifier is set to the cluster identifier of the next cluster root hub (block 522) and operations resume at block 512. If all the cluster root hubs have been evaluated then the cluster definitions are complete (block 520) and operations may end.

While the present invention has been described in regard to obtaining device characteristics for devices identified in the USB topology 70, as will be appreciated by those of skill in the art, such device characteristics may be obtained in a depth-wise sequence, where devices connected to a device are obtained until a device with no further devices connected to it is reached. Alternatively, the device characteristics may be obtained in a breadth-wise fashion where device characteristics for all devices at a given degree of remoteness from the root hub are obtained before devices for the next further degree of remoteness are obtained. Alternatively, a combination of depth-wise and bread-wise traversal of the USB topology 70 could be utilized. As will be appreciated by those of skill in the art, other sequences of obtaining device characteristics may also be utilized. The particular sequence in which the USB topology is traversed may depend on the format or manner in which the device topology is stored. Accordingly, the present invention should not be construed as limited to a particular sequence of traversal of the USB device topology.

Furthermore, while the present invention has been described with reference to a particular sequence of operations, the sequence or sequences of operations are provided for illustrative purposes and are not intended to limit the invention to the particular sequence described. On the contrary, embodiments of the present invention may include any sequence of operations which provide for the segmentation of USB devices into logical clusters based on the connection topology of the USB devices.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of segmenting a plurality of Universal Serial Bus (USB) devices connected to a common root hub into clusters, the method comprising:

obtaining a device topology of the plurality of USB devices connected to the common root hub;

traversing the device topology to identify a USB hub which is connected to a predefined port of another USB hub as a cluster root hub; and identifying USB devices connected to a cluster root hub other than a USB hub connected to the predefined port of another USB hub so as to associate the USB devices with the cluster root hub; and treating as a cluster the USB devices associated with the same cluster root hub.

2. A method according to claim 1, wherein the predefined port is port 1.

3. A method according to claim 1, wherein the step of obtaining the device topology comprises the steps of:

requesting the device topology via an operating system utility; and receiving the device topology from the operating system utility.

4. A method according to claim 1, further comprising the step of communicating with the USB devices in the same cluster as if the USB devices were components of a single device.

5. A method according to claim 1, wherein the steps of traversing, identifying and treating are carried out for the entire device topology so as to define each cluster root hub in the device topology and clusters of USB devices of associated with each cluster route hub.

6. A method according to claim 1, wherein the step of traversing the device topology is carried out in a depth-wise fashion.

7. A method according to claim 1, wherein the step of traversing the device topology is carried out in a breadth-wise fashion.

8. A method according to claim 3, further comprising the step of associating an alias address with each of the USB devices within the cluster so as to provide an address for each of the USB devices within the cluster which identifies the USB device as within the cluster.

9. A method according to claim 8, wherein an application utilizes the alias addresses to access the USB devices without revising the application.

10. A method according to claim 1, wherein the steps of obtaining, traversing, identifying and treating are carried out automatically without user intervention.

11. A system for segmenting a plurality of Universal Serial Bus (USB) devices connected to a common root hub into clusters, comprising:

means for obtaining a device topology of the plurality of USB devices connected to the common root hub;

means for traversing the device topology to identify a USB hub which is connected to a predefined port of another USB hub as a cluster root hub;

means for identifying USB devices connected to a cluster root hub other than a USB hub connected to the predefined port of another USB hub so as to associate the USB devices with the cluster root hub; and means for treating as a cluster the USB devices associated with the same cluster root hub.

12. A system according to claim 11, wherein the predefined port is port 1.

13. A system according to claim 11, wherein the means for obtaining the device topology comprises:

means for requesting the device topology via an operating system utility; and means for receiving the device topology from the operating system utility.

14. A system according to claim 11, further comprising means for communicating with the USB devices in the same cluster as if the USB devices were components of a single device.

15. A system according to claim 11, wherein the means for traversing, means for identifying and means for treating utilize the entire device topology so as to define each cluster root hub in the device topology and clusters of USB devices of associated with each cluster route hub.

16. A system according to claim 11, wherein the means for traversing traverses the device topology in a depth-wise fashion.

17. A system according to claim 11, wherein the means for traversing the device topology traverses the device topology in a breadth-wise fashion.

18. A system according to claim 13, further comprising means for associating an alias address with each of the USB devices within the cluster so as to provide an address for each of the USB devices within the cluster which identifies the USB device as within the cluster.

19. A system according to claim 18, wherein an application utilizes the alias addresses to access the USB devices without revising the application.

20. A system according to claim 11, wherein the system comprises a point of sale terminal.

21. A system according to claim 20, wherein the clusters of USB devices comprise expansion checkout lanes of the point of sale terminal.

22. A system according to claim 20, wherein the USB devices in a cluster comprise a display, a keyboard and a cash drawer.

23. A system according to claim 22, wherein the USB devices further comprise a magnetic stripe reader and a printer.

24. A computer program product for segmenting a plurality of Universal Serial Bus (USB) devices connected to a common root hub into clusters, comprising:

computer readable program code embodied in a computer readable medium, the computer readable program code comprising:

computer readable program code which obtains a device topology of the plurality of USB devices connected to the common root hub;

computer readable program code which traverses the device topology to identify a USB hub which is connected to a predefined port of another USB hub as a cluster root hub;

computer readable program code which identifies USB devices connected to a cluster root hub other than a USB hub connected to the predefined port of another USB hub so as to associate the USB devices with the cluster root hub; and computer readable program code which treats as a cluster the USB devices associated with the same cluster root hub.

25. A computer program product according to claim 24, wherein the predefined port is port 1.

26. A computer program product according to claim 24, wherein the computer readable program code which obtains the device topology comprises:

computer readable program code which requests the device topology via an operating system utility; and computer readable program code which receives the device topology from the operating system utility.

27. A computer program product according to claim 24, further comprising computer readable program code which communicates with the USB devices in the same cluster as if the USB devices were components of a single device.

28. A computer program product according to claim 24, wherein the computer readable program code which traverses, computer readable program code which identifies and computer readable program code which treats utilize the entire device topology so as to define each cluster root hub in the device topology and clusters of USB devices of associated with each cluster route hub.

29. A computer program product according to claim 24, wherein the computer readable program code which traverses, traverses the device topology in a depth-wise fashion.

30. A computer program product according to claim 24, wherein the computer readable program code which traverses the device topology traverses the device topology in a breadth-wise fashion.

31. A computer program product according to claim 26, further comprising computer readable program code which associates an alias address with each of the USB devices within the cluster so as to provide an address for each of the USB devices within the cluster which identifies the USB device as within the cluster.

32. A computer program product according to claim 31, wherein an application utilizes the alias addresses to access the USB devices without revising the application.

33. A computer program product according to claim 24, further comprising computer program code which automatically executes the computer program code which obtains, the computer program code which traverses, the computer program code which identifies and the computer program code which treats without user intervention.

* * * * *